US012331154B2

(12) United States Patent
Ceresa

(10) Patent No.: US 12,331,154 B2
(45) Date of Patent: Jun. 17, 2025

(54) CURABLE RESIN AND METHOD AND SYSTEM FOR INSULATING ELECTRICAL ITEMS THEREWITH

(71) Applicant: AEV HOLDINGS LTD, Birkenhead Merseyside (GB)

(72) Inventor: Amedeo Ceresa, Birkenhead Merseyside (GB)

(73) Assignee: AEV Holdings Limited (GB)

( * ) Notice: Subject to any disclaimer, the term of this patent is extended or adjusted under 35 U.S.C. 154(b) by 587 days.

(21) Appl. No.: 17/291,277

(22) PCT Filed: Nov. 4, 2019

(86) PCT No.: PCT/IB2019/059444
§ 371 (c)(1),
(2) Date: May 4, 2021

(87) PCT Pub. No.: WO2020/095174
PCT Pub. Date: May 14, 2020

(65) Prior Publication Data
US 2022/0002471 A1    Jan. 6, 2022

(30) Foreign Application Priority Data

Nov. 5, 2018  (GB) ..................................... 1818050

(51) Int. Cl.
| | | |
|---|---|---|
| *C08G 59/06* | (2006.01) | |
| *B05D 1/02* | (2006.01) | |
| *B05D 1/18* | (2006.01) | |
| *B05D 1/28* | (2006.01) | |
| *B05D 3/04* | (2006.01) | |

(Continued)

(52) U.S. Cl.
CPC ......... *C08G 59/063* (2013.01); *C08G 59/022* (2013.01); *C08G 59/68* (2013.01); *H01B 3/40* (2013.01); *H01B 19/02* (2013.01)

(58) Field of Classification Search
None
See application file for complete search history.

(56) References Cited

U.S. PATENT DOCUMENTS 4,128,378 A * 12/1978 Otsu ...................... B29C 39/00
                                                              29/729
5,213,846 A    5/1993 Tsuneta et al.
(Continued)

FOREIGN PATENT DOCUMENTS

DE        4206733 A1    9/1993
EP        0459745 A2   12/1991
(Continued)

OTHER PUBLICATIONS

Momentive Technical Datasheet, "Epikote Resin 828," pp. 1-2. (2007) (Year: 2007).*
(Continued)

*Primary Examiner* — Ha S Nguyen
(74) *Attorney, Agent, or Firm* — Fishman Stewart PLLC

(57) ABSTRACT

A latent curable, single component, epoxy resin with a viscosity at 25° C. of between 50 and 100 poise may include,
(Continued)

by weight: i) 60-90% of epichlorohydrin and bisphenol F; ii) 10-40% of epichlorohydrin and bisphenol A; and iii) 2-10% of a reactive catalyst, which is an encapsulated aliphatic polyamine, which cures above 80° C.

27 Claims, 2 Drawing Sheets

(51) Int. Cl.
| | |
|---|---|
| *B05D 7/02* | (2006.01) |
| *C08G 59/02* | (2006.01) |
| *C08G 59/50* | (2006.01) |
| *C08G 59/68* | (2006.01) |
| *C08L 63/00* | (2006.01) |
| *C09D 163/00* | (2006.01) |
| *C09J 163/00* | (2006.01) |
| *H01B 3/40* | (2006.01) |
| *H01B 19/02* | (2006.01) |

(56) References Cited

U.S. PATENT DOCUMENTS

| | | | |
|---|---|---|---|
| 5,631,332 A | | 5/1997 | Karasawa et al. |
| 6,652,270 B1 | * | 11/2003 | Hogan ................. C08J 3/24 |
| | | | 425/149 |
| 2014/0125439 A1 | * | 5/2014 | Esseghir ............ C08G 59/686 |
| | | | 336/61 |

FOREIGN PATENT DOCUMENTS

| | | | | |
|---|---|---|---|---|
| EP | 1852479 A1 | | 11/2007 | |
| JP | 06267720 A | * | 9/1994 | .......... H01F 1/0533 |
| JP | H09165434 A | | 6/1997 | |
| JP | 2007056070 A | * | 3/2007 | |
| JP | 2009283439 A | * | 12/2009 | |

OTHER PUBLICATIONS

Universal Selector, "Epiclon EXA-830LVP Technical Datasheet," pp. 1-2, last edited 2020. (Year: 2020).*
English abstract for EP-1852479.
English abstract for JP-H09165434.
English abstract for DE-4206733.

* cited by examiner

CURABLE RESIN AND METHOD AND SYSTEM FOR INSULATING ELECTRICAL ITEMS THEREWITH

CROSS-REFERENCE TO RELATED APPLICATIONS

This application claims priority to International Patent Application No. PCT/IB2019/059444, filed on Nov. 4, 2019, and Great Britain Patent Application No. 1818050.5, filed on Nov. 5, 2018, the contents of both of which are hereby incorporated by reference in their entirety.

TECHNICAL FIELD

This invention relates to a latent curable, single component, epoxy resin, a method and systems for insulating electrical items, and the resulting resin impregnated items.

BACKGROUND

The manufacture of electric items utilises insulating resins and varnishes to e.g. improve the electrical, mechanical and heating performance of the items, and to reduce noise emissions and corrosion.

In most cases, the items are impregnated with a resin or varnish by methods including: brushing, spraying, dipping, (vacuum dipping and vacuum and pressure dipping), trickling and rolling. The technique selected depends on the item type and properties sought.

The impregnation process fills voids in the items with a liquid resin or varnish which is transformed into a solid after a chemical and physical reaction known as polymerisation.

The resins and varnishes most typically used include, but are not limited to, unsaturated polyesters (imides) with vinyl toluene, styrene, diallyl phthalate, acrylates and styrene's. Other resins include alkyl, phenolic, and epoxy resins in, or absent of, solvents and with or without catalysts.

Art identified includes:

EP 1,852,479, which discloses an epoxy resin containing coating for abrasive surfaces.

U.S. Pat. No. 5,213,846, which discloses a corrosion resistant coating; and

U.S. Pat. No. 5,631,332 which discloses curing agents for epoxy resins.

The insulating resins and varnishes are selected based on the properties sought and other factors including: ease of use, polymerization speed and storage stability.

It is also desirable to address the environmental impact of the use of these resins and varnishes which are typically applied with organic solvents and use energy costly processing techniques.

It is an object of the present invention to develop more environmentally friendly resins for impregnating electrical items and improved systems and methodology for treating such items.

SUMMARY

In accordance with a first aspect of the present invention there is provided a latent curable, single component, epoxy resin comprising, by weight:
60-90% of epichlorohydrin and bisphenol F;
10-40% of epichlorohydrin and bisphenol A; and
2-10% of a highly reactive catalyst, which is an encapsulated aliphatic polyamine, which cures above 80° C.

Preferably the aliphatic polyamine is a modified polyamine.

The aliphatic polyamine may be modified, by any means known in the art including, but not limited to: polyethylene polyamine adducts with nitriles, alkylene oxides, aldehydes, and ketones, as well as mono and di-epoxides.

Examples of such modified polyamines are disclosed in ISSN 19954212, Polymer Science, Series D. Glues and Sealing Materials, 2010, Vol. 3, No. 3, pp. 177-180. Pleiades Publishing, Ltd., 2010, Incorporated by reference, and the Original Russian Text Z. A. Zubkova, M. F. Stetsyuk, T. A. Georgitsa, 2009, published in Klei. Germetiki. Tekhnologii, 2009, No. 12, pp. 12-16.

More preferably:
the epichlorohydrin and bisphenol F is present in an amount of 70-90%;
the epichlorohydrin and bisphenol A is present in an amount of 10-30%; and
the highly reactive catalyst is present in an amount, by weight, of between 4-8%.

In accordance with a second aspect of the present invention there is provided an item of electrical equipment comprising a component which has been bonded to another component, coated, or impregnated with a resin, which is the catalysed reaction product of the epoxy resin of the first aspect of the present invention and has an average molecular weight of less than 700.

Preferably the epoxy resin, when cured, has the following properties:

| Thermal Class | UL1446 | | 200☐ C. |
|---|---|---|---|
| Shore D hardness | DIN 53505 | | 90 |
| Deflection temperature | IEC1006 | | 120° C. |
| Bond strength | IEC1033 | 23° C. | >400N |
| Twisted coil | | 155° C. | 70N |
| Elongation at break | ISO 527 | | <0.5% |
| Thermal Conductivity | ISO 8894-1 | | 0.4 W/M/K |
| Dielectric strength | IEC 60243-1 | | >200 kV/mm |
| Dielectric constant | IEC 250 | | 3.9 @ 50 Hz |
| Volume resistivity | IEC 93 | | $>10^{13}$ ohm/cm$^3$ |

The item of electrical equipment includes two types of machines: rotary and static machines, with or without additional components, such as, for example, permanent magnets, shafts, housings, and commutators.

Rotary machines include, but are not limited to: a motor comprising a stator winding and rotor, generator or alternator, whereas static machines include, but are not limited to, a static electrical winding, transformer, reactor, choke coil or inductor.

The item will typically comprise a component to be insulated, such as a conductive winding.

In the most favoured embodiment the item is totally impregnated with the resin.

These items are made into products, such as, industrial motors, traction motors, electric vehicles, automobiles, home appliances or power tools.

According to a third aspect of the present invention there is provided a system for producing an item of electrical equipment as per the second aspect of the invention comprising:
a first heating chamber for pre-heating the item;
a tank for a resin;
an impregnation chamber;
a first vacuum pump operatively connected to the impregnation chamber;

a second heating chamber for gelling the resin impregnated item;

one or more curing ovens; and a cooling chamber where the item is cooled.

Preferably the system comprises a plurality of ovens that items pass through sequentially to cure the resin, and the temperature of each oven increases as the item passes through the sequence, to optimise the curing process.

Thus, the system further comprises an item handling means for conveying the items within the system, including between the plurality of ovens. The item handling means may comprise, for example, robotized manipulators, conveyors and sensors.

Preferably, but not essentially, the first heating chamber is heated by magnetic induction. In a particularly favoured embodiment, a multiple induction is used to reduce hysteresis of the transfer of heat from the surfaces closer to the inductor to the rest of the item. Magnetic induction is fast, cheap and efficient and obviates a requirement for thermal insulation.

In a favoured and simplified system, the tank for the resin is an, as supplied, container (e.g. metal drum, can or cartridge) of resin which is linked to the system which may form an arm of an item manufacturing or assembly line. This can be used directly or more preferably feeds a secondary tank where lower volumes or given doses of the resin may be thermally and physically controlled.

At present many items are removed from a manufacturing assembly line and taken for resin treatment elsewhere because the process is slow and "dirty".

The system of the third aspect of the invention and the associated methodology of the fourth aspect, described hereafter, overcome these problems and provide a relatively fast and "clean" process which does not have the large capital costs and associated high energy running costs of current processing regimes.

Most preferably the system immerses items in the resin and removes excess resin quickly and efficiently providing better item finishing. The system achieves this by incorporating a centrifuge in the immersion chamber which can reach high speeds in short times to displace excess resin.

The electrically insulating resins, such as those of the first aspect of the invention, have viscosities at 25° C. (typically of between 50 and 100 poise) which, on first appearance would leave a person skilled in the art thinking they would be unsuitable. However, on heating they become more mobile, such that at 40° C. they have a viscosity of between 5 and 10 poise. Under negative pressure e.g. 50 m Bar (5000 $Nm^{-2}$) they can impregnate the voids in and around e.g. copper windings quickly, and excess resin can be easily displaced by for example using centrifugation before the resin is gelled.

The process also allows for accurate control of the amount of resin deposited, since with automation consistency can be achieved.

Preferably, but not essentially, the second heating chamber is heated by magnetic induction. This chamber functions to gel the resin.

Once gelled, the item is transferred to an oven or series of ovens where it is held for a given time at a given temperature until it is fully cured. This is preferably an automated process controlled by computer but may be done manually.

Other component elements of the system include a cooling chamber, preferably together with an air compressor, air cooler and vacuum pump.

According to a fourth aspect of the present invention there is provided method of treating an item of electrical equipment comprising a component which requires an electrically insulating resin to be applied, comprising the steps of:

pre-heating the item to a first temperature for a given time;

applying an electrically insulating resin;

gelling the resin;

curing the resin by heating the item, in a stepped manner, to a temperature of at least 165° C., and preferably about 200° C.; and cooling the item.

Preferably between steps:

ii) and iii) excess resin is removed.

Most preferably the excess resin is removed by a centrifugation step.

The method may apply the resin by one of: impregnation, brushing, spraying, dipping, rolling and/or trickling.

Where the method applies the resin by dipping this may be vacuum or vacuum and pressure dipping.

Most preferably the method applies the resin by impregnation, most preferably under a vacuum.

This involves submerging the item in the resin and forcing the resin into voids under vacuum.

After impregnation the item is removed (or the impregnation chamber emptied) and excess resin removed, most preferably using a centrifugal force.

Where the process utilises the apparatus or system of the third aspect of the invention the preferred method comprises the steps of:

pre-heating the item to a first temperature for a given time in a first heating chamber;

heating the resin to a second temperature to reduce its viscosity in a tank;

pumping or moving the resin into an impregnation chamber, and impregnating the item with resin under vacuum;

emptying the impregnation chamber of resin;

using a centrifuge to remove excess resin from the item;

gelling the resin impregnated item by heating it to, at least, a temperature of at about 130° C., more preferably about 160° C. in a second heating chamber;

maximising polymerisation, by inline curing in one or more curing ovens with increasing temperatures to about 165° C. for a given time; and then cooling the item to a temperature of in a cooling chamber.

Preferably in the first temperature is about 50° C., more preferably about 70° C. in the second temperature is about 40° C., in the gelling temperature is about 130° C., and in the temperature is increased to about 165° C., and up to about 200° C.

Preferably in v) the centrifuge operates at a speed of between 1000 and 2500 rpm.

Preferably the vacuum pump operates at about 5 m Bar (500 $Nm^{-2}$).

Whilst the system may employ a variety of component parts of varying designs it has been found advantageous to utilise a centrifuge and oven having the following features.

Preferably the centrifuge has a double chamber such that moving parts are not in contact with the resin. This increases the durability and stability of the process. To ensure a compact design, and both quick fill and quick emptying, it is preferred that the resin inlet and outlet tubes are substantially semi-circular in cross section maximising the space within the impregnating chamber and e.g. the item being impregnated.

Preferably the ovens comprise an entrance and exit through which e.g. a robotized manipulator introduces and removes an item to or from the oven. Movement may be in both the longitudinal and vertical (up-down) direction. The entrance and exit apertures are most preferably opened and closed by way of pneumatic gates which ensure effective temperature management of the oven. The interior walls of the oven are covered by stainless steel and the oven is insulated with e.g. rockwool. The ovens include temperature sensors for temperature management and air circulation means, such as a centrifugal fan.

The system and method giving rise to novel items (on a size for size basis, based on e.g. the processing of an electric motor stator winding of size 100×100×150 mm and a weight (with copper winding) of 8.5 Kg) have numerous benefits over the existing systems and methods used to provide items treated with different resins including:

energy savings of 95%;
a cycle time reduction of 93%—from 270 to 18 minutes;
a 50% reduction in resin consumption;
zero waste;
zero organic emissions;
more efficient production (24 stators in the impregnation line instead of 360);
reduced space occupied by machine (150 to 5 cubic metre);
reduced maintenance (by 90%) and operating costs (including energy);
reduced capital expenditure; and
improved item quality/performance due to controlled delivery/removal of excess resin.

BRIEF DESCRIPTION OF THE DRAWINGS

Embodiments of the invention are further described hereinafter with reference to the accompanying drawings, in which.

DETAILED DESCRIPTION

A typical latent curable, single component, epoxy resin (14) of the invention is provided in Example 1 below:

EXAMPLE 1

60-90% by weight of epichlorohydrin and bisphenol F;
10-40% by weight of epichlorohydrin and bisphenol A; and
2-10% by weight of a highly reactive catalyst, which is an encapsulated aliphatic polyamine, which cures above 80° C.

Figure 1:
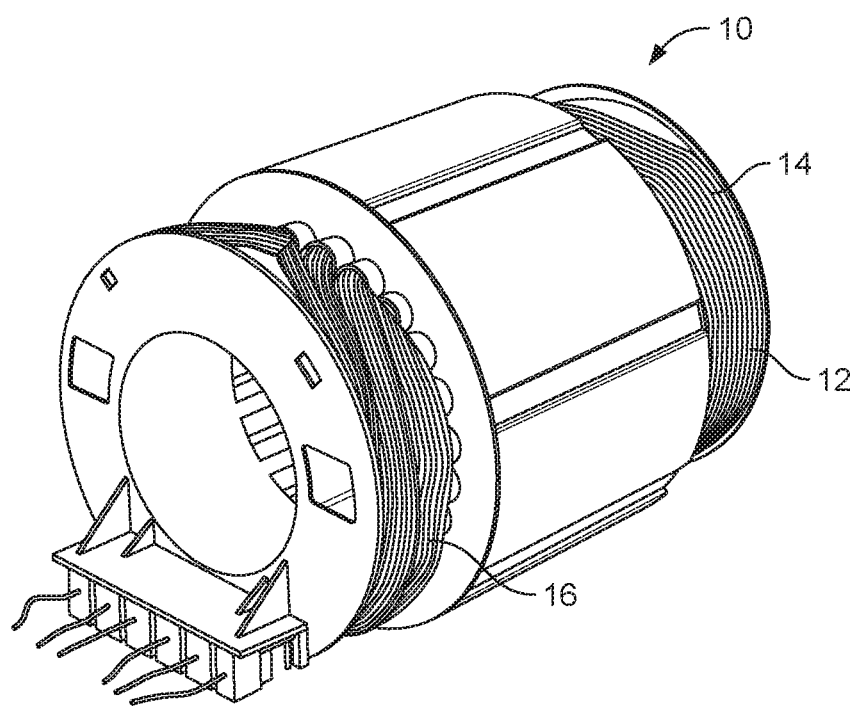
FIG. 1 is an illustration of an exemplary item.

A resin as per Example 1 is used to electrically insulate an item (10) as for example, illustrated in FIG. 1. The item is a rotor or stator comprising a component (12), in this case a copper winding (16), that requires to be insulated by treatment with the resin (14).

Figure 2A:
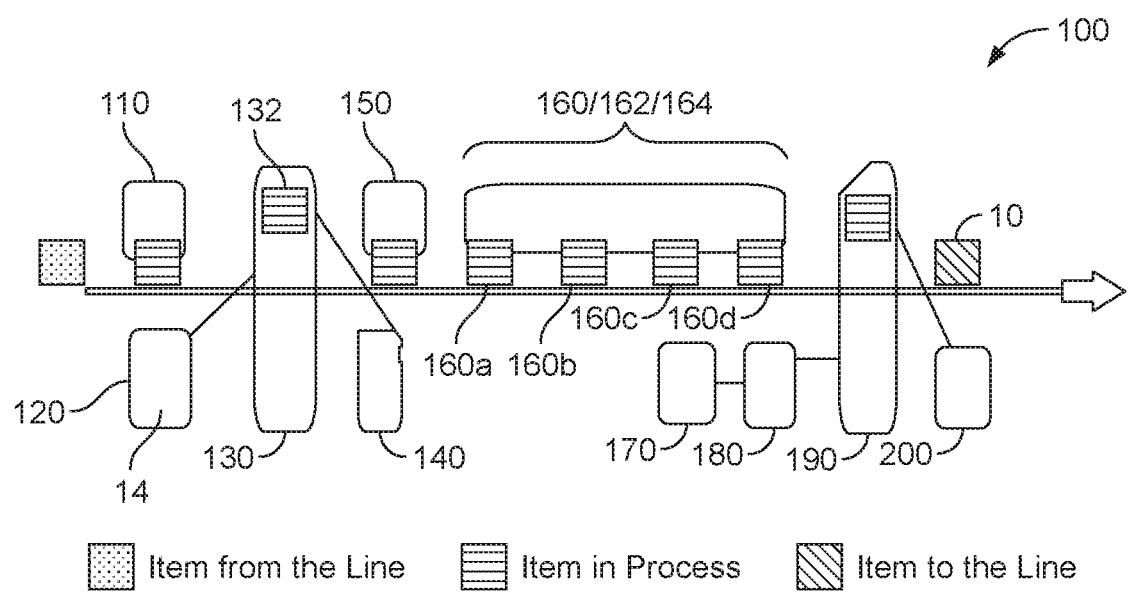
FIG. 2a is a schematic illustrating the system components.

Referring to FIG. 2A the system/apparatus (100) for producing an item of electrical equipment (10) comprises:
a first heating chamber (110) for pre-heating the item;
a tank (120) for a resin (14);
an impregnation chamber (130);
a first vacuum pump (140) operatively connected to the impregnation chamber (130);
a second heating chamber (150) for gelling the resin impregnated item;
one or more curing ovens (160); and
a cooling chamber (190) where the item is cooled.

The cooling chamber further comprises an air compressor (170), air cooler (180) and vacuum pump (200). It may comprise a "fountain" contact mold with the circulation of a cold fluid.

The centrifuge (132), within the impregnation chamber (130), is illustrated in more detail in FIG. 3, however before describing it in more detail, the process of the invention is described with reference to FIG. 2B.

In general, the process comprises the steps of:
pre-heating (310) the item (10) to a first temperature (T1) for a given time (t1);
applying (330) a resin (14) of the invention to the item (10);
gelling (350) the resin;
curing (360) the resin by heating the item, in a stepped manner, to a temperature of at least about 165° C. and up to 200° C.; and
cooling (390) the item (10).

Figure 2B:
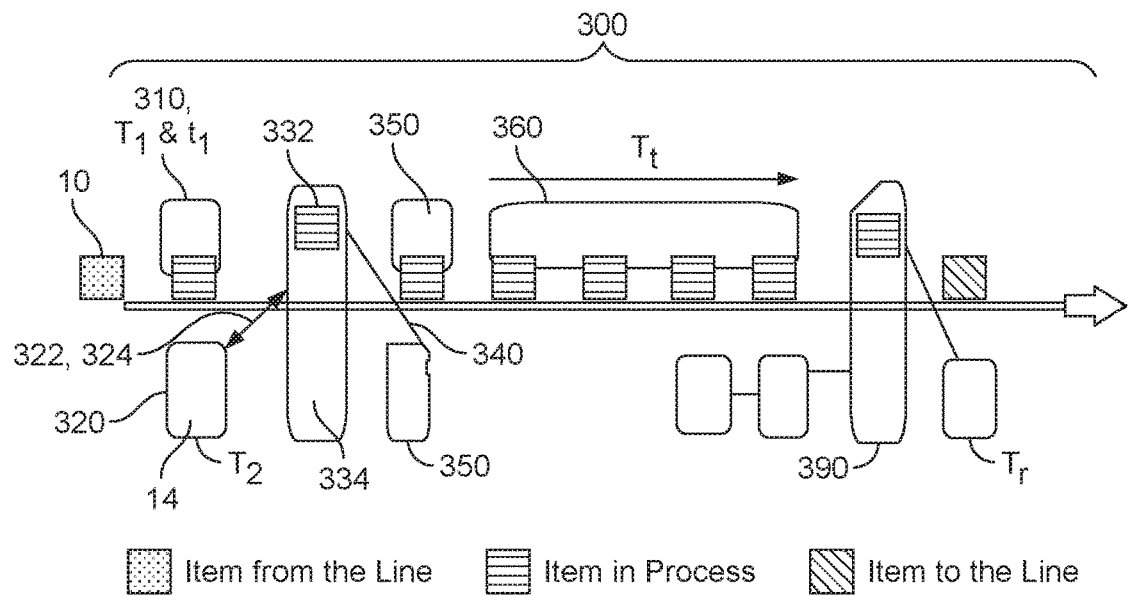
FIG. 2b is a schematic illustrating the process steps.

However, as illustrated across FIGS. 2A and 2B it comprises the steps of
pre-heating (310) the item (10) to a first temperature (T1) for a given time (t1) in a first heating chamber (110);
heating (320) the resin (14) to a second temperature (T2) to reduce its viscosity in a tank (120);
pumping (322) the resin (14) into an impregnation chamber (130), and impregnating (334) the item (10) with resin under vacuum (340);
emptying (324) the impregnation chamber (130) of resin (14);
using a centrifuge (332) to remove excess resin (14') from the item (10);
gelling (350) the resin impregnated item (10) by heating it to, at least, a temperature of about 160° C. in a second heating chamber (150);
maximising polymerisation, by in-line curing (360) in one or more curing ovens (160) with increasing temperatures (T) for given times (t); and then
cooling (390) the item (10) to a temperature of (Tr) in a cooling chamber (190).

Figure 3:
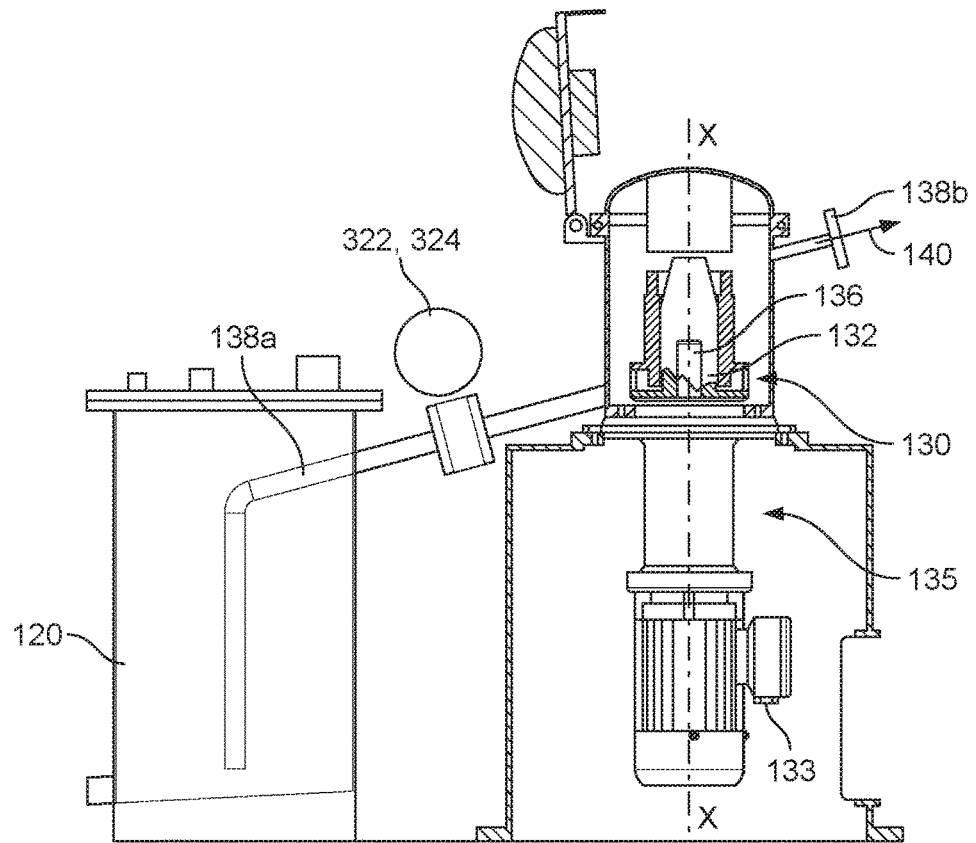
FIG. 3 is a detailed illustration of the impregnation chamber, with centrifuge.

The infusion chamber (130) with centrifuge (132) is illustrated in more detail in FIG. 3 where it is shown connected to resin tank (120) and with an item (10) held suspended, in an upright position along a rotor (136) axis (X-X), about which the item is spun. Connecting tubes (138a) facilitate filling (322) and emptying (324) of resin to and from the resin tank (120) and a separate tube (138b) leads to the vacuum pump (140). A large motor (133) drives the centrifuge and is located in a chamber (135) below the infusion chamber to provide stability.

Examples of items processed using the resins, system and methodology are further illustrated in Examples 2 to 5 below.

EXAMPLE 2

An Electric Motor Winding

The example given describes the impregnation of an electric motor stator winding. The stator, and associated winding, is of dimensions: internal diameter 100 mm, external diameter 150 mm, height 100 mm. It has a weight, with the copper winding, of 8.5 kg.

The item is processed in a system as described with reference to FIG. 2A.

The stator is pre-heated using magnetic induction. A localised magnetic field with a specific intensity and frequency) is applied to the stator. Induction also causes the heat to be transferred to the winding which is manufactured using materials with good heat conduction properties.

The resin is heated in its supply container (120), weight 25 kg. A heated strip maintains the resin at about 40° C. to ensure greater viscosity and optimum impregnation, and a mixing lid is used to keep the temperature uniform.

Impregnation occurs under vacuum to ensure any voids are completely filled. Excess resin is removed using centrifugal force (332). The impregnation chamber (130) is made of stainless steel and the centrifuge can spin to a rpm of 2200. The dimensions are sized in accordance with the item to be processed. A 5 m Bar (500 $Nm^{-2}$). (residual) vacuum pump (340) is connected to the impregnation/centrifuge chamber.

Magnetic induction is used to heat the item to the gelling temperature, which is at least about 130° C. and up to about 160° C. This may take about 1 minute to ensure initiation of polymerisation. The item is then transferred to the curing ovens (160) where the item is processed for given times at constant temperatures which increase as the item is moved through the system.

The stator is preferably cooled by surface contact with a profiled mould, using liquids at varying pressure and temperature. A vacuum (200) process is used to remove condensate produced by low temperatures.

The system steps are performed in a fully automated manner without the need for an operator or intervention alongside, or linked to, a production line.

Illustrative cycle run times are indicated below:

00:15—pre-heating of stator for 45 sec @5 kW. Temp. reached after 1 min delay 56° C.

02:11—cable set up for impregnation (to prevent damage during spinning)

02:40—valve check (open/close) for VOID preparation

02:54—switch ON void pump

03:00—vacuum level check on vacuum gauge

03:07—vacuum level reached

03:30—opening of resin INLET valve to fill the centrifugal tank (note that the resin is being sucked because of the vacuum)

03:36—resin flowing through the connection from the tank to the vacuum tank

03:48—resin level check from glass wall

04:32—resin reaches desired level (just above winding head)

04:35—resin INLET closure

04:44—release of vacuum

04:55—resin INLET valve re-opening in order to let resin flow out

05:28—check that resin level is below mandrel

05:44—centrifugation (5 sec to reach 2070 rpm; 10 sec spinning; 5 sec to reach 0 rpm)

06:08—opening of centrifuge 06:32—drip check (no drips!)

06:39—positioning for CURING process

06:47—1st curing cycle 45 sec @5 kW, temp. reached after 1 min delay 91° C.

08:36—2nd curing cycle 45 sec @5 kW, temp. reached after 1 min delay 135° C.

10:20—3rd curing cycle 45 sec @5 kW, temp. reached after 1 min delay 165° C.

13:36—visual check for dripping/resin status

5:55—4th curing cycle 20 sec @5 kW, temp. reached after 1 min delay 180° C.

This illustrative impregnation process did not include cooling which requires a further, approximately 6 minutes.

The resin deposited on the component was about 80 grams and the process used about 500W, with cooling.

Whilst impregnation and centrifugation are favoured for the application of the resin, there are applications where this is not possible, as set out in Examples 3 to 5 below:

EXAMPLE 3

Motor Rotors

Very often the rotors on electric machinery have parts which do not require impregnation, for example shafts, contact manifolds and bearing seats, etc. For such items, a total impregnation technique cannot be used, and neither can the vacuum technique. Therefore, the trickling or rolling technique with the component in rotation must be used. Centrifugation is not required. The advantages remain the same.

EXAMPLE 4

Rotor and Stator Sheets

The system can be used to secure together sheets at the pack height required and if necessary attach permanent magnets at the same time. This procedure is ideal for automotive applications where complex profiles make it almost impossible, as well as being shunned by designers, to use traditional securing systems. Furthermore, this technology eliminates the need for insulated sheeting because insulation is applied during the securing and impregnation processes.

EXAMPLE 5

Transformers and Static Machinery

The process can be used for pre-heating, vacuum and pressure impregnation, with slow, or no, centrifugation, to protect heads.

The invention claimed is:

1. A system for producing an item of electrical equipment, comprising:
   i) a first heating chamber for pre-heating the item;
   ii) a tank for a resin;
   iii) an impregnation chamber, wherein the impregnation chamber comprises a centrifuge connected to the resin tank via connecting tubes, and wherein the centrifuge includes a rotor disposed within the impregnation chamber that holds the item suspended in an upright position along a rotor axis;
   iv) a first vacuum pump operatively connected to the impregnation chamber;
   v) a second heating chamber for gelling the resin impregnated item by heating through magnetic induction;
   vi) one or more curing ovens that heat the resin impregnated item, in a stepped manner, to a temperature of about 165° C. to 200° C.; and
   vii) a cooling chamber where the item is cooled.

2. A system as claimed in claim 1, comprising a plurality of curing ovens, and wherein the plurality of curing ovens heat the item for predefined durations at constant temperatures that increase as the item is moved through the plurality of ovens, and wherein the predefined durations are different.

3. A system as claimed in claim 2, comprising an item handler for conveying the item between the plurality of ovens.

4. A system as claimed in claim 1, wherein the first heating chamber is heated by magnetic induction.

5. A system as claimed in claim 1, wherein the tank for resin is an, as supplied, container of resin.

6. A system as claimed in claim 1, wherein the centrifuge further includes a motor disposed in a separate chamber below the impregnation chamber along the rotor axis.

7. A system as claimed in claim 1, wherein the second chamber heats the resin impregnated item by magnetic induction to a gelling temperature of about 130° C. to about 160° C. for about 1 minute.

8. A system as claimed in claim 1, comprising controls facilitating the conveyance of the item to an oven, where the item is held for a given time at a given temperature such that curing is controlled.

9. A system as claimed in claim 1, wherein the cooling chamber further comprises an air compressor, air cooler and a second vacuum pump.

10. A method of treating an item of electrical equipment comprising a component, which requires an electrically insulating resin to be applied, utilizing a system as claimed in claim 1, the method comprising:
pre-heating the item to a first temperature for a given time in a first heating chamber;
applying an electrically insulating resin latent curable, single component, epoxy resin to the item in an impregnation chamber with a vacuum pump operatively connected to the impregnation chamber, the epoxy resin provided with a viscosity at 25° C. of between 50 and 100 poise comprising, by weight:
60-90% of epichlorohydrin and bisphenol F;
10-40% of epichlorohydrin and bisphenol A; and
2-10% of a highly reactive catalyst, which is an encapsulated aliphatic polyamine, which cures above 80° C.;
ii) gelling the resin in a second heating chamber;
iii) curing the resin by heating the item in one or more curing ovens, in a stepped manner, to a temperature of at least about 165° C. to 200° C.; and
iv) cooling the item in a cooling chamber.

11. A method as claimed in claim 10, further comprising removing excess resin before gelling the resin.

12. A method as claimed in claim 11, wherein removing the excess resin is done via centrifugation.

13. A method as claimed in claim 10, wherein the resin is applied to the item by one of: impregnation, brushing, spraying, dipping, rolling or trickling.

14. A method as claimed in claim 13 wherein the dipping is vacuum or vacuum and pressure dipping.

15. A method as claimed in claim 10, wherein the method uses impregnation.

16. A method as claimed in claim 15, wherein the impregnation is conducted in a vacuum.

17. A method as claimed in claim 15, wherein excess resin is removed from the item by centrifugation.

18. A method as claimed in claim 10, wherein:
i) pre-heating the item to a first temperature for a given time in the first heating chamber;
ii) heating the resin to a second temperature to reduce viscosity of the resin in a tank;
iii) pumping the resin into the impregnation chamber, and impregnating the item with resin under vacuum;
iv) emptying the impregnation chamber of resin;
v) using a centrifuge to remove excess resin from the item;
vi) gelling the resin impregnated item by heating the resin impregnated item to, at least, a temperature of about 130° C. to about 160° C. in the second heating chamber;
vii) maximising polymerisation, by inline curing in the one or more curing ovens with increasing temperatures for given times; and then
viii) cooling the item to a temperature of in the cooling chamber.

19. A method as claimed in claim 18, wherein:
the first temperature is about 50° C.;
the second temperature is about 40° C.;
the gelling temperature is about 130° C.; and
the temperature is increased to about 165° C. to about 200° C.

20. A method as claimed in claim 18, wherein:
the centrifuge operates at a speed of between 1000 and 2500 rpm.

21. A method as claimed in claim 16, wherein the vacuum pump operates at about 5 m Bar (500 $Nm^{-2}$).

22. A system as claimed in claim 1, wherein the second heating chamber heats the resin impregnated item to a temperature of about 130° C. to about 160° C. for gelling.

23. A system as claimed in claim 1, wherein the resin has a viscosity at 25° C. of between 50 and 100 poise and comprises, by weight:
i) 60-90% of epichlorohydrin and bisphenol F;
ii) 10-40% of epichlorohydrin and bisphenol A; and
iii) 2-10% of a reactive catalyst, which is an encapsulated aliphatic polyamine, which cures above 80° C.

24. A system as claimed in claim 1, wherein the item is part of an industrial motor, a traction motor, an electric vehicle, an automobile, a home appliance or a power tool.

25. A system as claimed in claim 1, wherein the first heating chamber pre-heats the item to a temperature of about 50° C. to 70° C.

26. A system as claimed in claim 1, wherein the first vacuum pump operates at about 5 m Bar (500 $Nm^{-2}$).

27. A system as claimed in claim 1, wherein the centrifuge operates at a speed of between 1000 and 2500 rpm.

* * * * *